United States Patent [19]
Thompson et al.

[11] Patent Number: 5,597,047
[45] Date of Patent: Jan. 28, 1997

[54] RADIATOR MOUNTING FOR INTEGRATED POWER MODULE

[75] Inventors: David Thompson, Darlington; Alistair J. Foster, Gainford; Steve Sokell, Ferryhill; John T. Foot, Hartburn; Brian Hoskinson, Darlington, all of England

[73] Assignee: Cummins Engine Company Limited, Surrey, England

[21] Appl. No.: 551,539

[22] Filed: Nov. 1, 1995

Related U.S. Application Data

[63] Continuation of Ser. No. 406,634, Mar. 20, 1995, abandoned, which is a continuation of Ser. No. 43,277, Apr. 6, 1993, abandoned.

[30] Foreign Application Priority Data

Oct. 6, 1992 [DE] Germany .............................. 9213450 U

[51] Int. Cl.$^6$ ..................................................... B60K 11/04
[52] U.S. Cl. ...................................... 180/68.4; 180/68.6
[58] Field of Search ................................ 180/68.4, 68.6; 165/41, 67, 68, 149; 123/41.49

[56] References Cited

U.S. PATENT DOCUMENTS

| | | | |
|---|---|---|---|
| 3,123,170 | 3/1964 | Bryant | 180/68.4 |
| 3,144,859 | 8/1964 | Walton . | |
| 3,964,449 | 6/1976 | Thien et al. | 123/41.49 X |
| 4,086,886 | 5/1978 | Edmaier et al. . | |
| 4,196,774 | 4/1980 | Hoffmann | 180/68.4 X |
| 4,213,426 | 7/1980 | Longhouse . | |
| 4,315,540 | 2/1982 | Moranne | 180/68.4 X |
| 4,398,508 | 8/1983 | Moon et al. . | |
| 4,403,648 | 9/1983 | Styok | 180/68.6 X |
| 4,514,140 | 4/1985 | Knopf . | |
| 4,522,160 | 6/1985 | Speers et al. . | |
| 4,770,234 | 9/1988 | Hiraoka et al. | 180/68.6 X |
| 4,774,911 | 10/1988 | Yamaguchi et al. . | |
| 5,036,931 | 8/1991 | Iritani | 180/68.4 X |
| 5,088,572 | 2/1992 | Schroeder et al. | 180/68.4 X |
| 5,271,473 | 12/1993 | Ikeda et al. | 180/68.4 |
| 5,287,940 | 2/1994 | Ogawa et al. | 180/68.4 |

FOREIGN PATENT DOCUMENTS

| | | | |
|---|---|---|---|
| 0116529 | 9/1979 | Japan | 180/68.4 |
| 0036723 | 3/1983 | Japan | 180/68.4 |
| 0217718 | 12/1983 | Japan | 123/41.49 |
| 425616 | 3/1935 | United Kingdom . | |

*Primary Examiner*—Brian L. Johnson
*Attorney, Agent, or Firm*—Woodard, Emhardt, Naughton Moriarty & McNett

[57] ABSTRACT

An engine cooling system for a water-cooled, internal combustion engine includes a radiator support frame which is configured so as to receive the radiator and a series of four vibration dampening modules disposed between the support frame and the radiator. Additionally, the support frame is attached directly to the engine block by a top bracket and two side support struts. The fan cowling is attached to the support frame such that the engine-driven fan and the fan cowling are both fixed in position relative to each other and to the engine to allow for minimal clearance between the impeller tips and the fan cowling. One vibration dampening module is disposed on each side of the radiator between the radiator and the support frame and two vibration dampening modules are disposed along the lower edge at spaced apart locations. These four supporting points and vibrational isolation mounts permit only very limited relative motion between the radiator and the support frame providing not only an efficient design structurally but the ability to provide these components as a cooling module which provides greater handling and assembly efficiencies.

10 Claims, 6 Drawing Sheets

RADIATOR MOUNTING FOR INTEGRATED POWER MODULE

This application is a continuation of application Ser. No. 08/406,634, filed Mar. 20, 1995, now abandoned, which is a continuation of application Ser. No. 08/043,277, filed Apr. 6, 1993, now abandoned.

BACKGROUND OF THE INVENTION

The present invention relates in general to the design relationship between the radiator and the engine-driven fan for a water-cooled, internal combustion engine. More particularly, the present invention relates to the rigid mounting of the fan and fan cowling to the engine and the vibrational isolation of the radiator which is connected to the engine by way of a support frame.

In the design of a water-cooled, internal combustion engine attention must be given to the radiator and the engine-driven fan. There are certain desirable relationships which should improve cooling efficiency and contribute to reduced installation work. For example, the efficiency of cooling is dependent upon, among other factors, the size of the fan tip clearance between the ring of the fan cowling and the tips of the impeller blades. With regard to installation efficiencies, it would be an advantage to be able to supply and install the engine, fan, fan cowling and radiator as a single unit. The present invention provides a novel structural arrangement that satisfies both of the aforementioned desirable relationships.

One problem or concern with regard to the size of the clearance between the ring of the fan cowling and the tips of the impeller is when the fan cowling is rigidly connected to the radiator and is allowed to move relative to the fan when the system is subjected to vibration. In those known systems where the radiator is vibrationally isolated from the engine and the fan cowling is rigidly connected to the radiator, the fan blade (impeller tips) must be sized and positioned so that they do not contact the fan cowling. The easy solution is to build into the design sufficient clearance, but the greater the tip to cowling clearance the less efficient the design. Therefore it is preferred to design the fan and fan cowling relationship will a minimum of clearance so as to increase the efficiency of cooling.

In another known system the radiator and engine are separately mounted on and vibrationally isolated from the chassis or frame. The fan cowling is rigidly connected to the engine. In this system the engine, fan and fan cowling are free to move relative to the radiator when vibration occurs. A flexible coupling ring is provided between the fan cowling ring and the radiator. This system has the disadvantages that the radiator and engine must be separately supplied and filled to the chassis or frame and that the coupling ring takes up valuable space between the radiator and the engine.

Related and representative cooling systems known to the present inventors which the present invention improves upon include the following:

| Patent No. | Patentee | Issue Date |
| --- | --- | --- |
| 3,144,859 | Walton | August 18, 1964 |
| 4,086,886 | Edmaier et al. | May 2, 1978 |
| 4,213,426, | Longhouse | Jul. 22, 1980 |
| 4,398,508 | Moon et al. | Aug. 16, 1983 |
| 4,514,140 | Knopf | Apr. 30, 1985 |
| 4,522,160 | Speers et al. | Jun 11, 1985 |

-continued

| Patent No. | Patentee | Issue Date |
| --- | --- | --- |
| 4,774,911 | Yamaguchi et al. | Oct. 4, 1988 |
| 425,616 | Bowman-Gr. Britain | March 18, 1935 |

In accordance with the present invention there is provided a radiator/fan mounting for a power unit comprising a water-cooled internal combustion engine, characterized in that the fan is rotatable in a housing assembly that is rigidly fixed to the engine and which resiliently supports the radiator.

SUMMARY OF THE INVENTION

A radiator mount for an engine having an engine-driven fan according to one embodiment of the present invention comprises a radiator support frame, stationary attachment means for rigidly mounting the radiator support frame to the engine and isolation mount means for mounting the radiator to the support frame in such a way as to allow limited movement of the radiator relative to the radiator support frame.

One object of the present invention is to provide an improved radiator mount which provides for the rigid mounting of the fan and fan cowling to the engine and the vibrational isolation of the radiator which is connected to the engine.

Related objects and advantages of the present invention will be apparent from the following description.

DESCRIPTION OF THE PREFERRED EMBODIMENT

Figure 1:
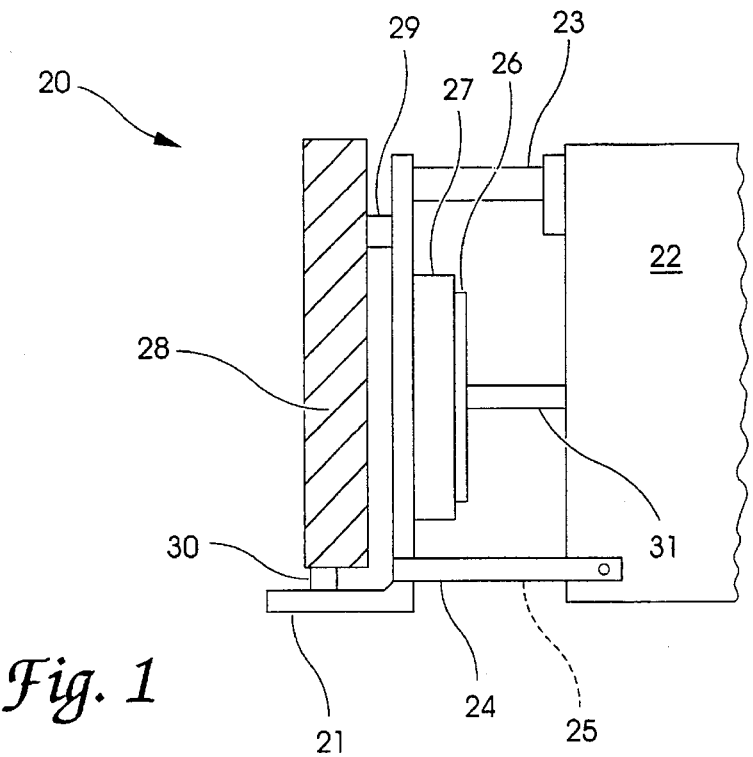
FIG. 1 is a schematic representation of an engine cooling system according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated in schematic form, the primary portions of an engine cooling system 20 which comprise the substance of the present invention. System 20 includes radiator support frame 21, engine block 22, top central bracket 23, two side support struts 24 and 25 (strut 25 is hidden from view though is opposite to support strut 24), fan 26, fan cowling 27, radiator 28, two side vibration dampers 29 and two lower vibration dampers 30. As will be described hereinafter, there is one side vibration damper 29 on each side of frame 21 attaching the radiator 28 to the frame and the two lower vibration dampers 30 are disposed between the frame 21 and radiator 28 along the lower edge of frame 21.

Still referring to FIG. 1, the radiator support frame 21 is rigidly connected to the engine block 22 by the top central bracket 23 and by the two side support struts 24 and 25. The engine (block 22) drives fan 26 by way of shaft 31 and the fan rotates with a very slight edge clearance (impeller tips) within fan cowling 27. By rigidly connecting the frame 21 to the engine 22 and by rigidly connecting the fan cowling 27 to the frame 21, any relatively movement between the tips of the fan blades and the inside surface (ring) of the fan cowling is extremely minimal. This allows the fan and fan cowling to be closely sized to one another in order to increase cooling efficiency.

Figure 2:
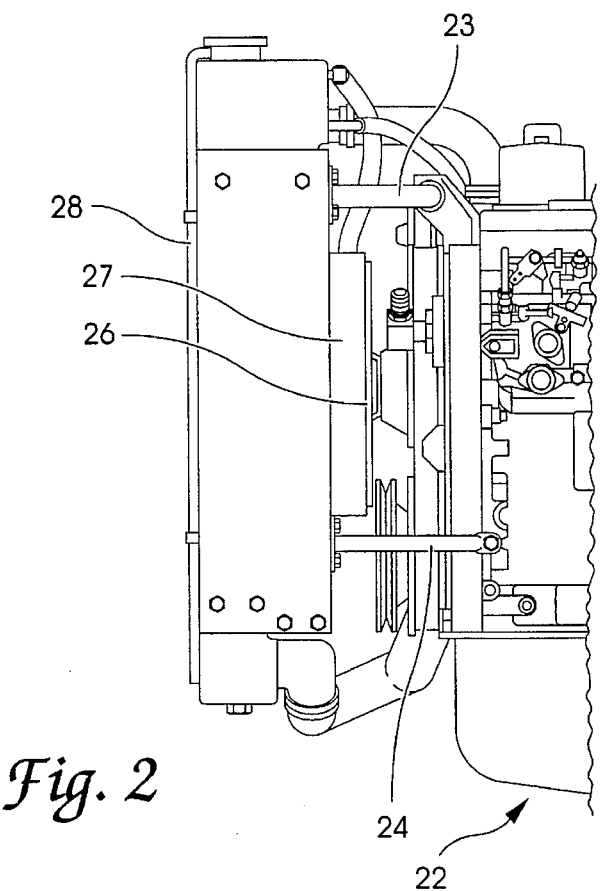
FIG. 2 is a partial, side elevational view of the FIG. 1 engine cooling system, providing specific structural details.

Referring to FIG. 2, the front portion of engine 22 and the engine cooling system 20 of FIG. 1 are illustrated in greater detail. Corresponding reference numerals are used in FIG. 2 in order to identify the actual FIG. 2 components which were only schematically represented in FIG. 1. A few other portions and components of engine 22 are also illustrated, though with a conventional construction there is no need to provide a detailed description as to the engine. It should suffice that the engine is a relatively conventional internal combustion engine which is water cooled and which directly drives the cooling fan.

Figure 3:
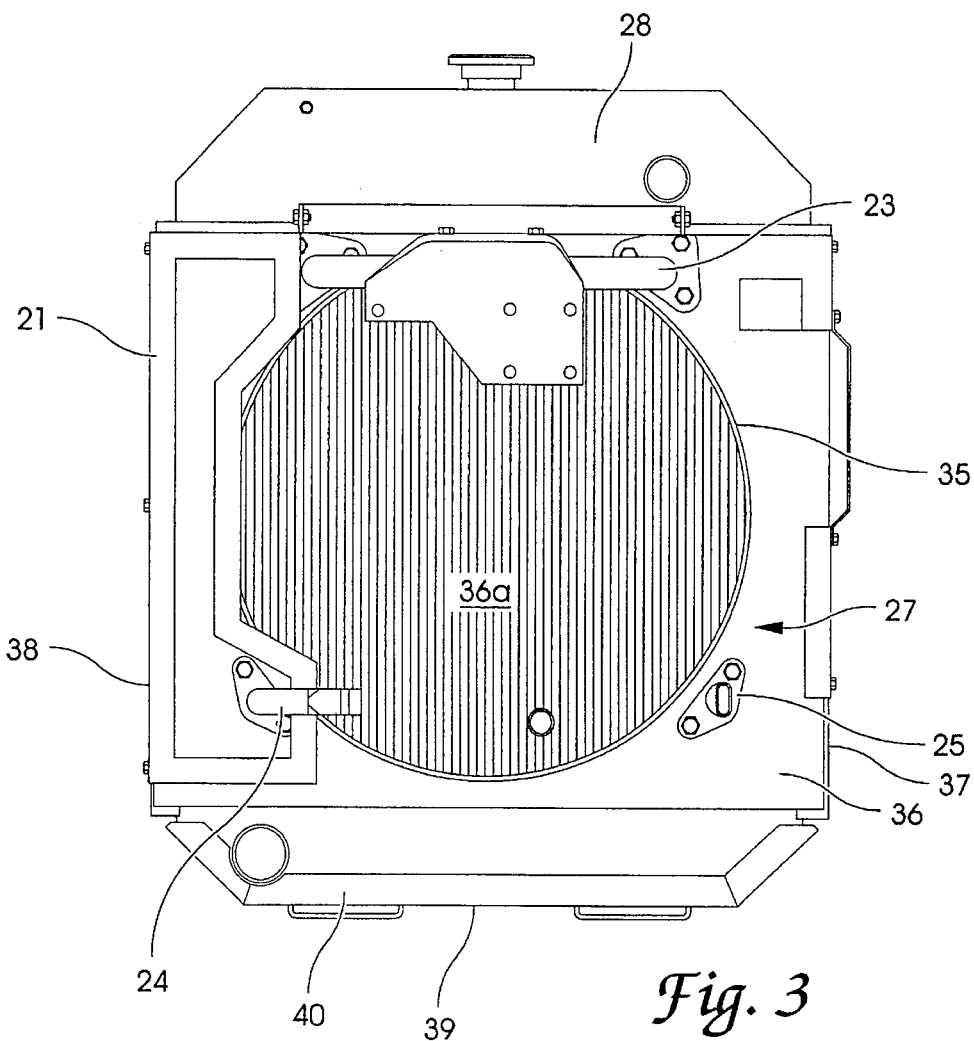
FIG. 3 is a rear elevational view of the FIG. 2 engine cooling system.
Figure 4:
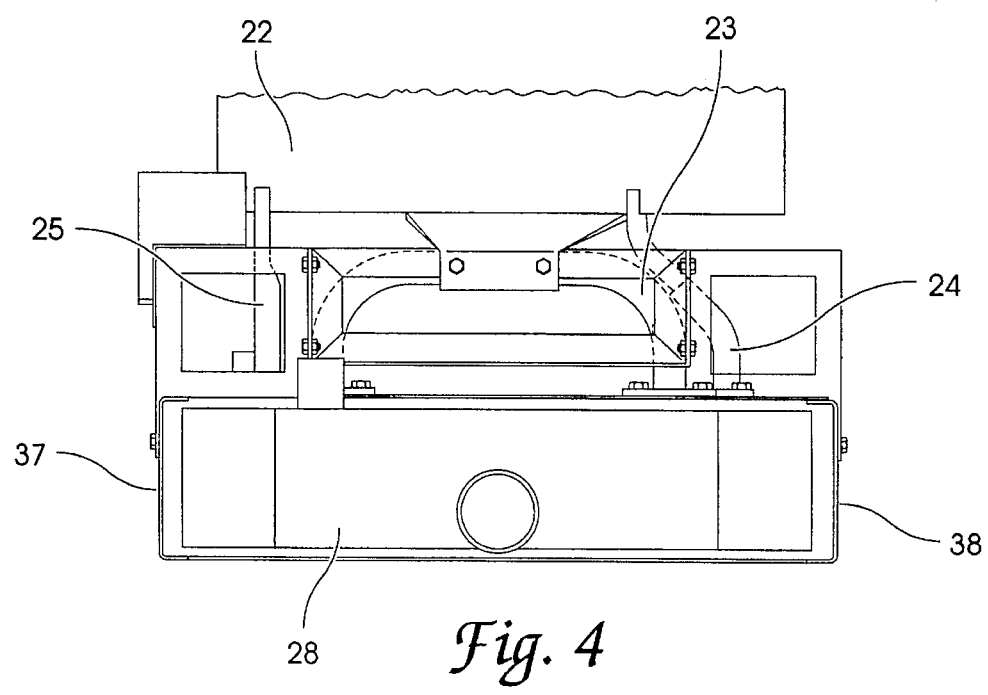
FIG. 4 is a top plan view of the FIG. 2 engine cooling system.
Figure 5:
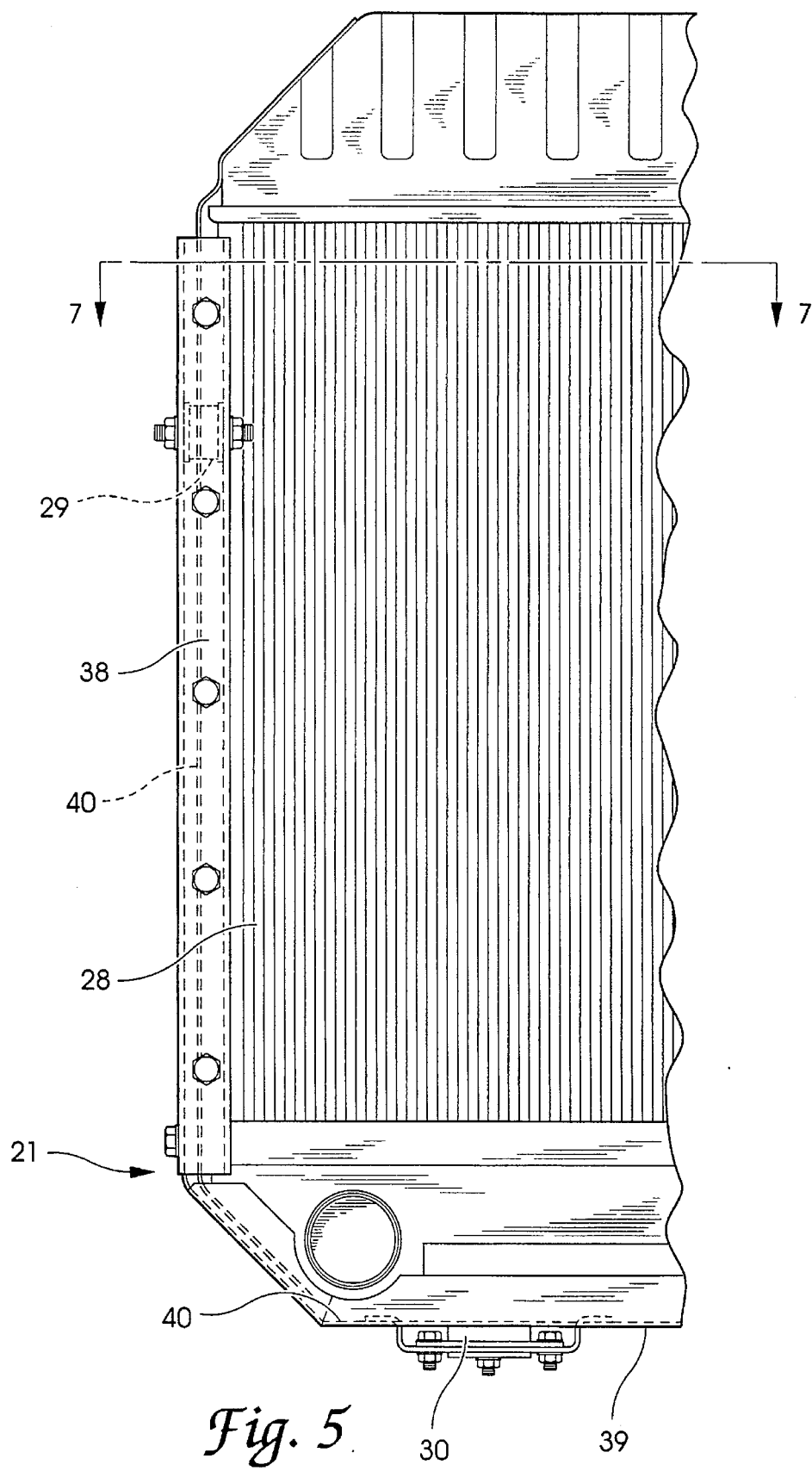
FIG. 5 is a partial, rear elevational view of the FIG. 2 engine cooling system.

Referring to FIGS. 3, 4 and 5, there is illustrated the radiator support frame 21 according to the present invention. Included as part of these three drawing figures are radiator 28 and fan cowling ring 35. FIG. 3 is a rear elevational view assuming an orientation where the front of the vehicle corresponds to the front of the radiator support frame. Radiator support frame 21 is a generally rectangular (3-sided), forwardly and upwardly open box having a separately attached rear panel 36 nearest the engine block 22 which is connected to side panels 37 and 38. Side panels 37 and 38 and bottom panel 39 extend outwardly away from rear panel 36 in a substantially normal or perpendicular direction. The two side panels 37 and 38 and the bottom panel 39 have inturned edges forming lips 40 which are used to receive and retain radiator 28 in its desired position when it is placed down into the radiator support frame 21.

Left side panel 37 is a generally U-shaped panel of sheet metal with various clearance holes and slots for receiving mounting hardware to assemble the left side panel to radiator 28 and to bottom panel 39. A plurality of weld nuts disposed on the rearward lip (flange) are used to receive mounting hardware to attach the rear panel 36 to left side panel 37.

Right side panel 38 is a generally U-shaped panel of sheet metal with various clearance holes and slots for receiving mounting hardware to assemble the right side panel to radiator 28 and to bottom panel 39. A plurality of weld nuts disposed on the rearward lip (flange) are used to receive mounting hardware to attach the rear panel 36 to right side panel 38.

Rear panel 36 is a substantially flat sheet metal panel with four mounting areas for hop central bracket 23 and for the two side support struts 24 and 25. Weld bolts are assembled through each mounting area and extend through clearance holes in the mounting plates for bracket 23 and struts 24 and 25. Welded to rear panel 36 is the fan cowling ring 35 which in combination with rear panel 36 creates the fan cowling 27. The ring 35 includes a generally cylindrical portion, which defines central aperture 36a, and an outwardly radiating flange. It is the flange that is spot welded to the rearward-facing surface of panel 36. Central aperture 36a is sized so as to be able to receive the fan 26 with a small clearance between the tips of the impeller blades (see FIG. 6) and the inside diameter wall of ring 35.

Figure 6:
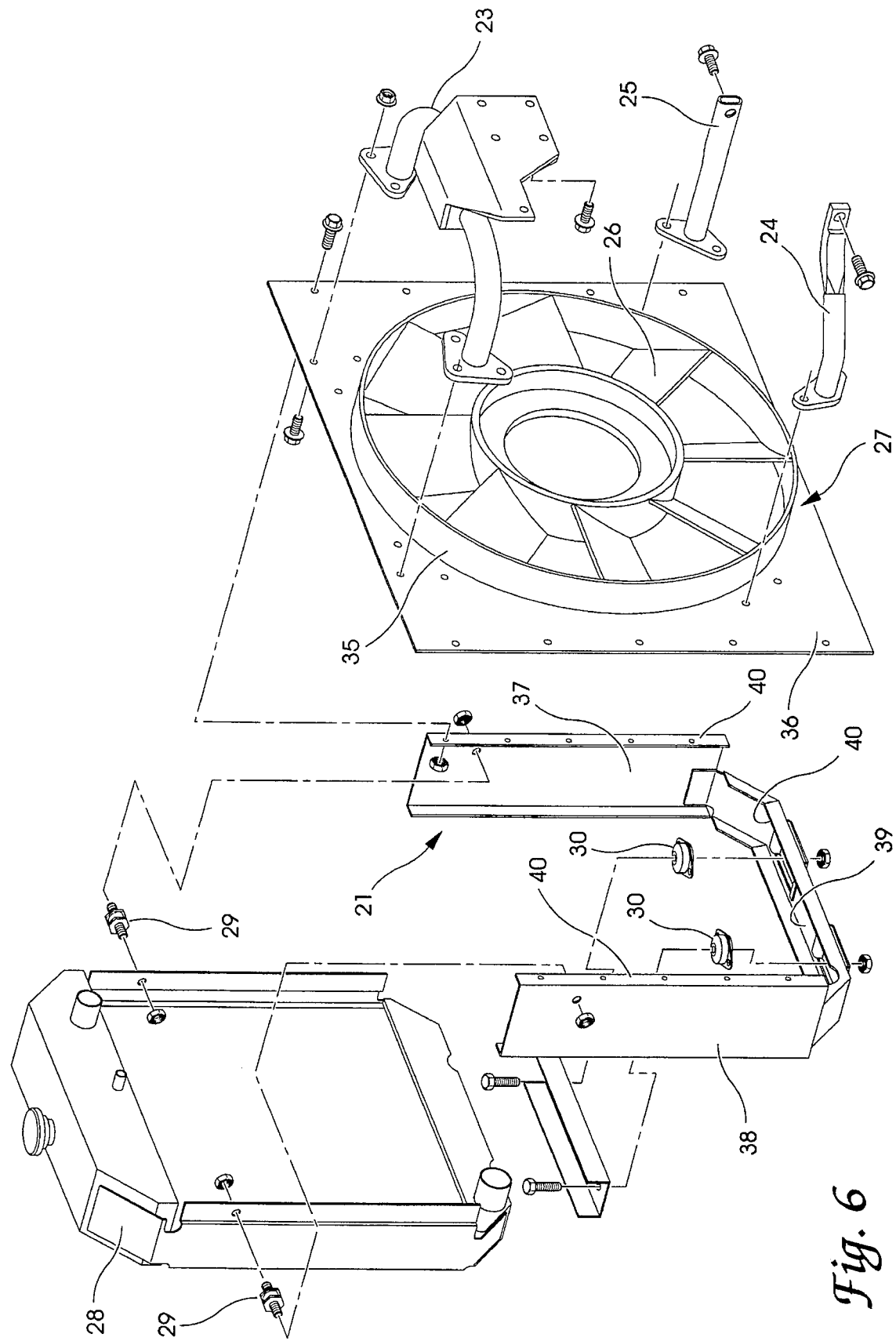
FIG. 6 is an exploded view of the FIG. 2 engine cooling system illustrating the specific component parts and their assembled relationship.

FIG. 6 is an exploded view of radiator 28, support frame 21, rear panel 36 (including a diagrammatic illustration of where the fan 26 and fan cowling 27 would be located), top center bracket 23 and the two side support struts 24 and 25. The dashed or broken lines note the connection of various components through their corresponding mounting holes. Also illustrated in FIG. 6 are the two side vibration dampers 29 and the two lower vibration dampers 30.

Figure 7:
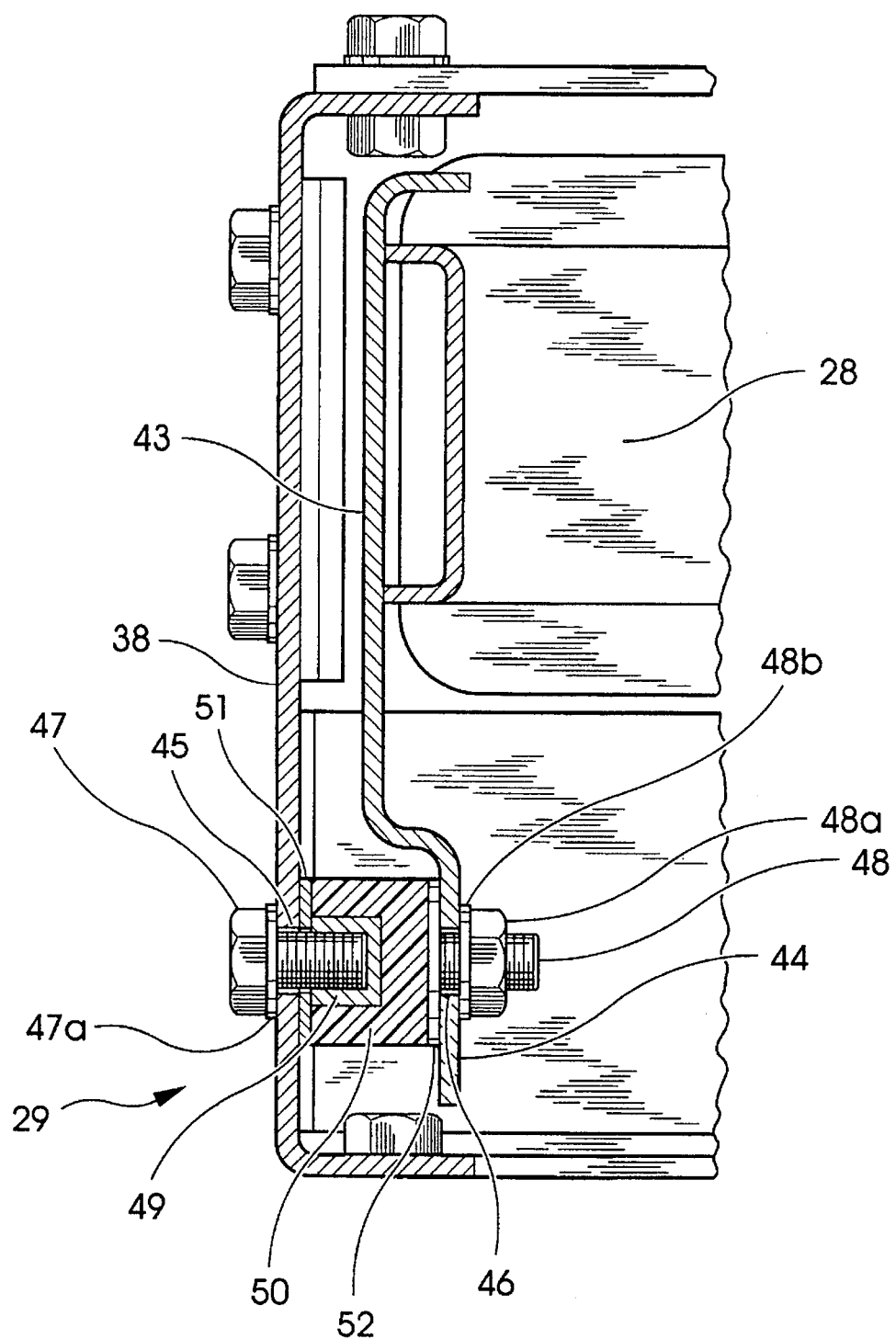
FIG. 7 is an enlarged, partial top plan view in partial section of a radiator mount as viewed along lines 7—7 in FIG. 5.

Referring to FIG. 7 the arrangement of one side vibration damper 29 relative to radiator 28 and side panel 38 is illustrated as a top plan view and partial section. The cutting plane is denoted by life 7—7 in FIG. 5. Attached or otherwise joined to radiator 28 is side mounting plate 43 which includes an inwardly offset portion 44 which provides clearance for vibration damper 29. Side panel 38 includes a clearance hole 45 which is in alignment with a corresponding clearance hole 46 in portion 44. Panel 38 via clearance hole 45 accepts the mounting hardware for one end of vibration damper 29, including tightening bolt 47. A flat washer 47a is disposed between panel 38 and the head of bolt 47. Offset portion 44 via clearance hole 46 accepts the mounting hardware for the opposite end of vibration damper 29, including threaded stud 48. A nut 48a and flat washer 48b complete the attachment.

Each vibration damper 29 includes a generally cylindrical insert 50 which is constructed from a rubber compound. In order to capture and control the cylindrical shape of insert 50 so as to prevent tearing, misalignment or too much side or radially spreading, two metal, disk-shaped support plates 51 and 52 are securely bonded to opposite ends of insert 50 by the use of a suitable adhesive. By bonding these two plates to insert 50, insert 50 is not able to radially spread at its ends enabling it to hold its generally cylindrical shape, under load, which helps to preserve its vibration dampening and shock isolation properties. Threaded insert 49 is molded into one end of insert 50 and receives the threaded end of tightening bolt 47. Threaded stud 48 is joined to the outer surface of support plate 52. The only material between insert 49 and plate 52 is the rubber of insert 50 thereby providing the desired shock and vibration isolation and dampening. A near identical construction to what is illustrated in FIG. 7 exists on the opposite side of radiator 28 for the other vibration damper 29 which connects the radiator 28 to side panel 37.

Figure 8:
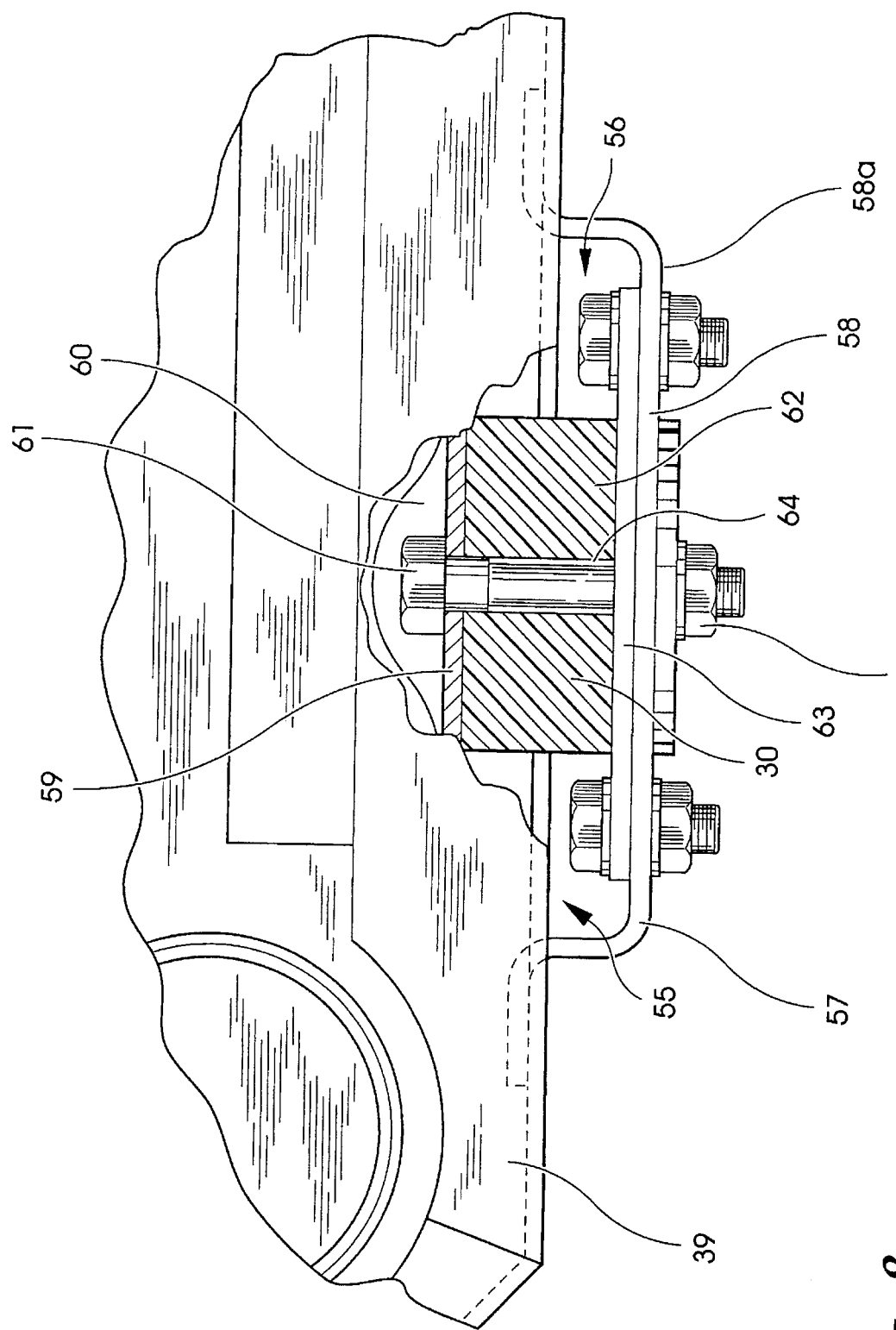
FIG. 8 is an enlarged, partial rear elevational view in partial section of a lower radiator mount, according to the present invention.

Referring now to FIG.8, the arrangement of one lower vibration damper 30 relative to radiator 28 and bottom panel 39 is illustrated as a rear elevational view in partial section. As illustrated in FIGS. 6 and 8, the lower wall portion of bottom panel 39 includes a pair of spaced-apart, generally rectangular openings 55. Welded into and over each of these two openings 55 is a corresponding mounting bracket 57. The generally U-shape of each bracket 57 creates a corresponding recessed pocket 56. Each bracket 57 includes a central aperture 58 and mounting holes 58a. An integral bottom mounting plate 59 is positioned over depression 60 which houses and captures the head of bolt 61 which passes through an aperture in plate 59.

Vibration damper 30 includes a generally cylindrical insert 62 which is constructed from a rubber compound. A mounting plate 63 is provided for attaching the insert to the mounting bracket 57 and in turn to the radiator 28 via bottom panel 39. Mounting plate 63 spans across aperture 58 and attaches (is bolted) through mounting holes 58a. In the preferred embodiment, plate 63 and insert 62 are securely joined to each other during the molding and curing of rubber insert 62. Alternatively the two may be joined by a suitable adhesive. Plate 63 helps to limit the radial spread of insert 62 under load so that the resiliency, shock absorbing and vibration dampening properties remain viable.

The attachment of vibration damper 30 to bottom panel 39, as described, also places the central aperture 64 of insert 62 in alignment with bolt 61. Hex nut 65 is used to secure the vibration damper 30 to integral mounting plate 59 which completes the assembly and vibration isolation of radiator 28. As was true for the vibration damper 29, there is a second vibration damper 30 used along the lower edge of the radiator 28 and which mounts and is assembled in a manner similar to that already described with regard to the vibration damper of FIG. 8. This second vibration damper 30 is spaced apart from the first as illustrated in FIG. 6.

The result of using four vibration dampers two along the lower surface and one on each side is to completely isolate and support the radiator within the support frame while the frame is securely and rigidly attached to the engine. This assembly thus provides all the components as a cooling module which provides greater efficiency in the handling and assembly. The radiator is supported at four points which is adequate to both carry its weight as well as provide adequate shock and vibration isolation. By connecting the fan and the fan cowling directly to the engine, those two components can be closely sized and toleranced so as to provide greater cooling efficiency.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A radiator mount for mounting a radiator to an engine having an engine-driven fan comprises:

a radiator support frame having two upstanding side panels and a bottom panel; said two upstanding side panels being connected to said bottom panel;

stationary attachment means for rigidly connecting said radiator support frame at a plurality of locations to said engine; and side isolation mount means positioned between and connected to said side panels and the radiator for mounting said radiator to each of said side panels so as to allow limited movement of said radiator relative to said radiator support frame;

bottom isolation mount means positioned between said bottom panel and the radiator and coupled to said bottom panel for mounting said radiator to said bottom panel so as to allow limited movement of said radiator relative to said radiator support frame; and wherein said side isolation mount means and said bottom isolation mount means being independent of each other.

2. The radiator mount of claim 1 wherein said radiator support frame includes a frame portion and a cooperating fan cowling portion which is attached on said frame portion and constructed with a clearance region to receive said engine-driven fan.

3. The radiator mount of claim 2 wherein said stationary attachment means having a top support bar and two oppositely disposed side support struts which extend between and rigidly connect the stationary attachment means to the engine.

4. The radiator mount of claims 3 wherein said top support bar is a U-shaped member having a central body portion and two free ends, said two free ends being attached to said radiator support frame.

5. The radiator mount of claim 2 wherein said two upstanding side panels and said bottom panel have an inturned portion for receiving and retaining the radiator therein.

6. The radiator mount of claim 5 wherein said side isolation mount means further providing a pair of oppositely disposed vibration dampening blocks.

7. The radiator mount of claim 6 wherein said bottom isolation mount means further providing a pair of spaced apart vibration dampening blocks.

8. The radiator mount of claim 7 wherein each of said vibration dampening blocks are fabricated out of rubber which is bonded to a corresponding support plate.

9. The radiator mount of claim 8 wherein said side isolation mount means further providing a side mounting plate connected to said side panel, said side mounting plate having an inwardly offset portion so as to provide clearance for said vibration dampening block; said vibration dampening block having an internally threaded end; a threaded fastener; and said side panel having an aperture therethrough for receiving said fastener; and wherein said fastener passing through said aperture and engaging said internally threaded end.

10. The radiator mount of claim 9 wherein:

said bottom panel having a pair of spaced-apart openings;

a pair of u-shaped mounting brackets connected to said bottom panel and extending over each of said spaced-apart openings;

said vibration dampening blocks being positioned on said mounting bracket;

an integral mounting plate being disposed on said vibration dampening blocks; and a pair of fasteners connecting said u-shaped mounting brackets and said vibration dampening block to said integral mounting plate.

* * * * *